Figure 1:
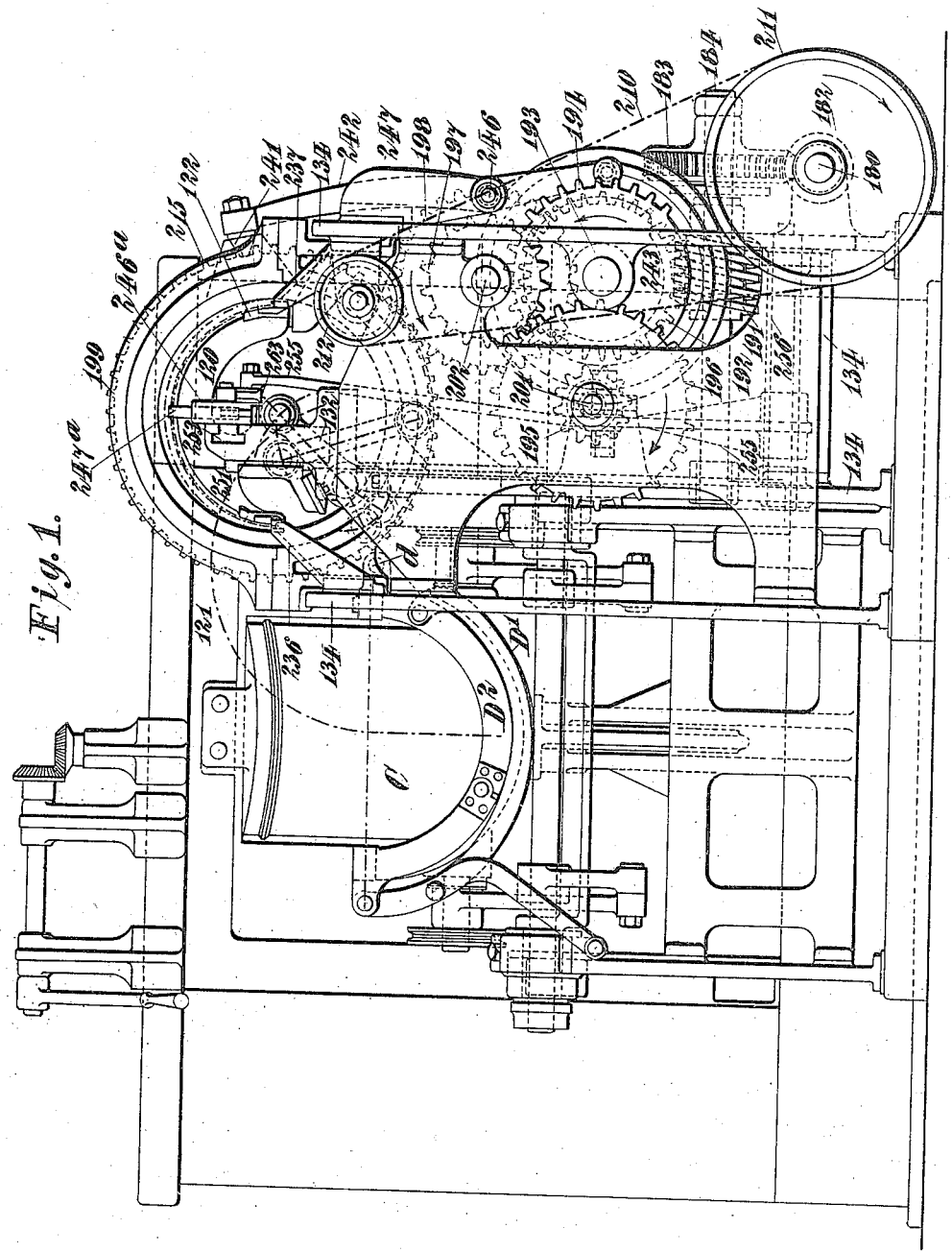

C. E. HOPKINS.
APPARATUS FOR FINISHING CURVED STEREOTYPES.
APPLICATION FILED MAR. 13, 1907.

1,240,850.

Patented Sept. 25, 1917.
15 SHEETS—SHEET 5.

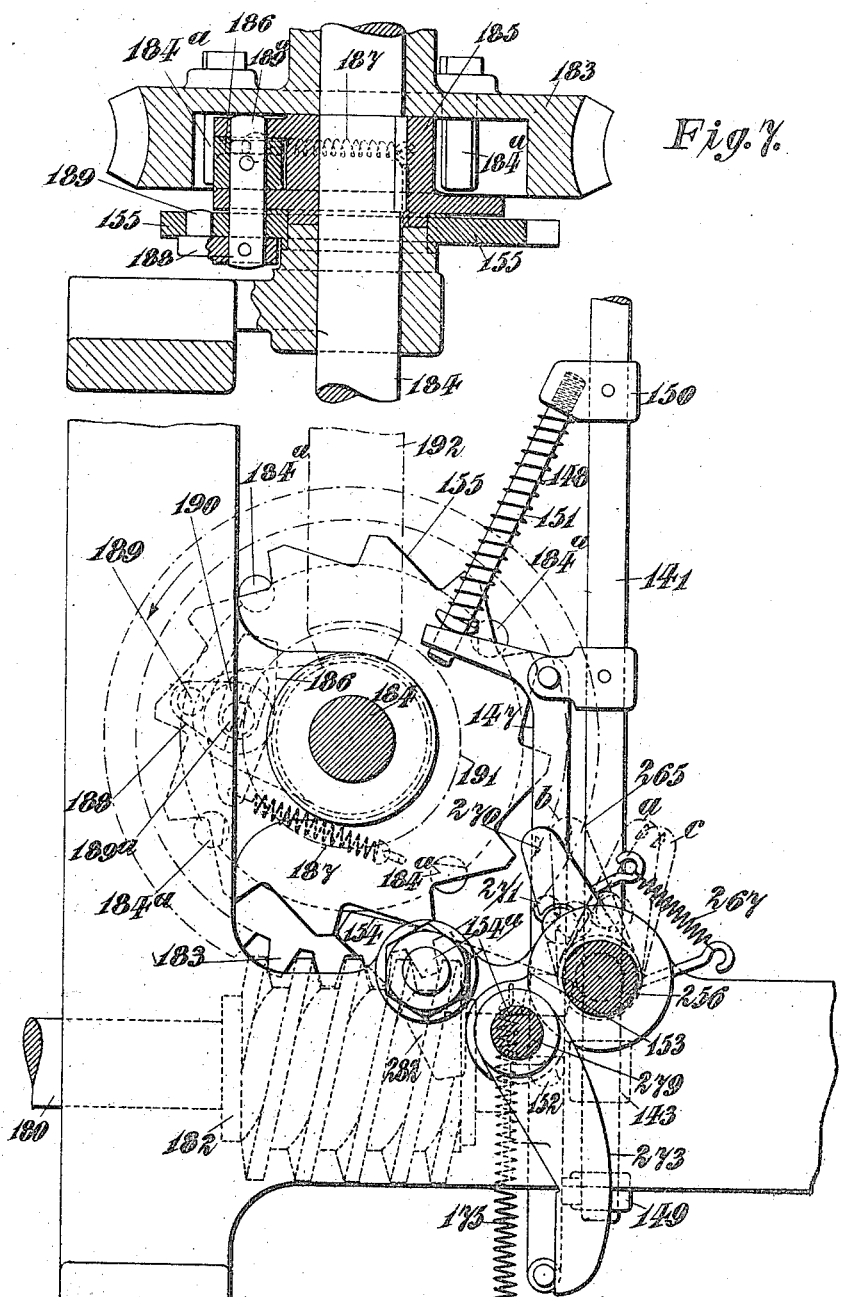

C. E. HOPKINS.
APPARATUS FOR FINISHING CURVED STEREOTYPES.
APPLICATION FILED MAR. 13, 1907.
1,240,850.
Patented Sept. 25, 1917.
15 SHEETS—SHEET 11.
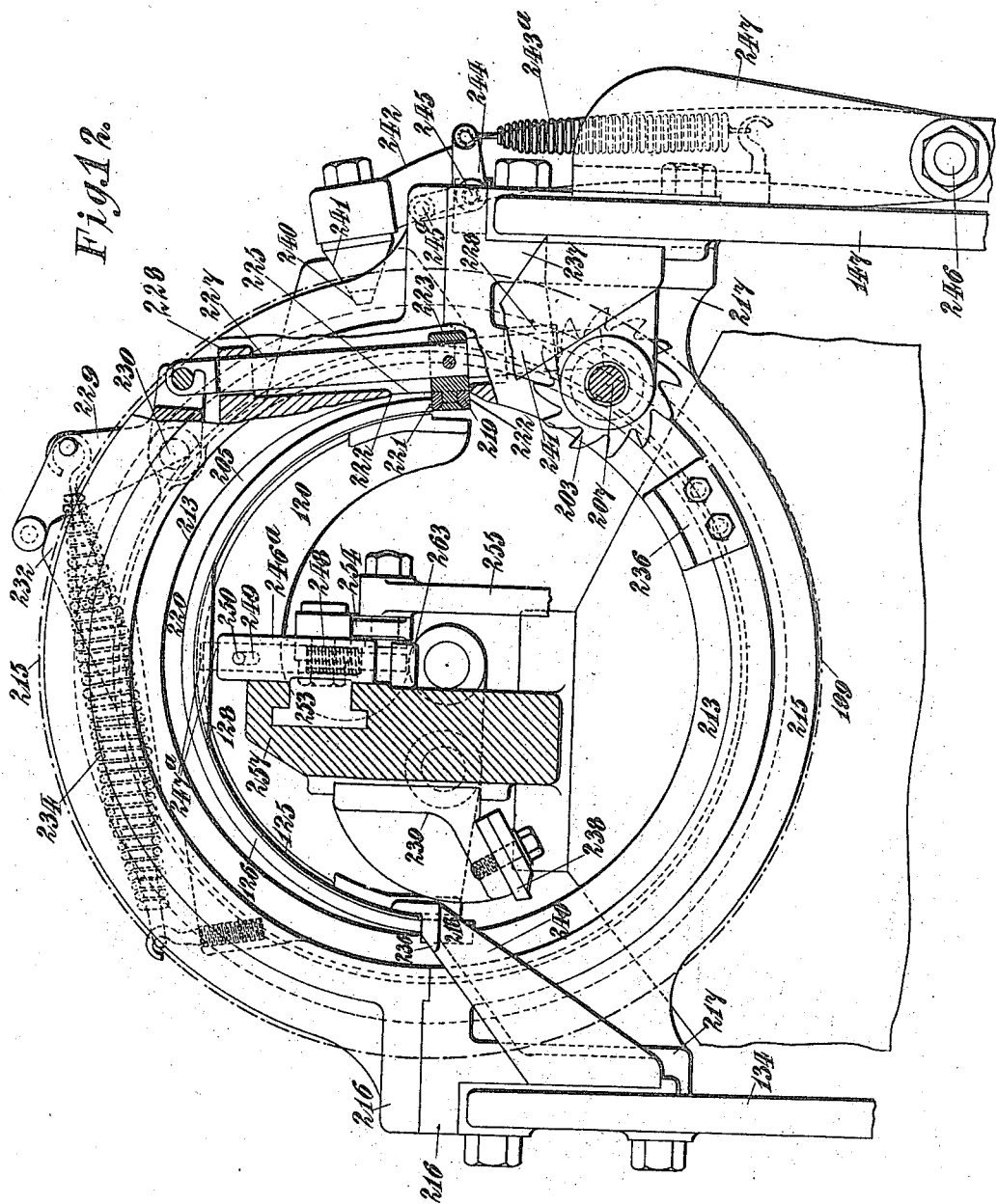

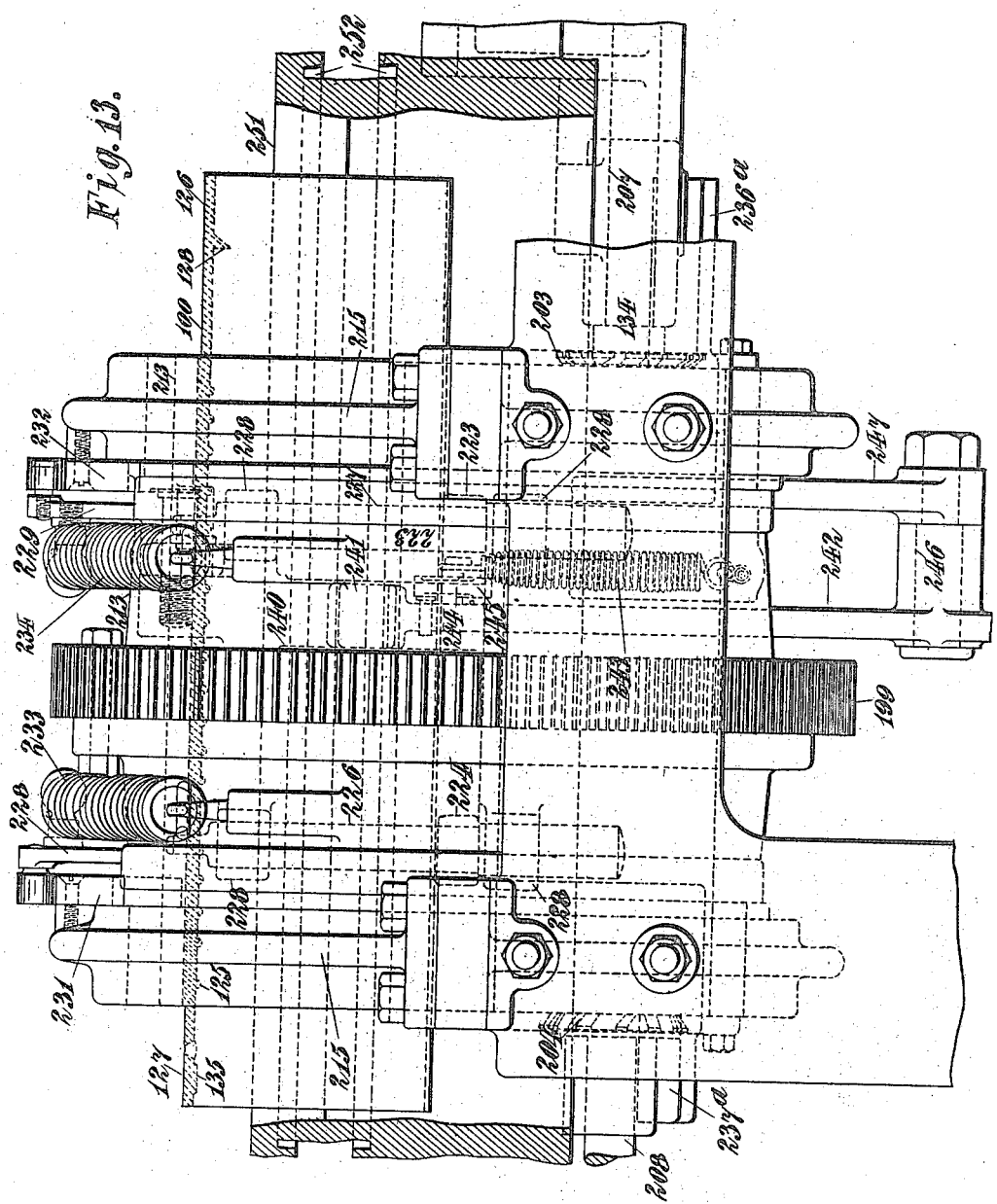

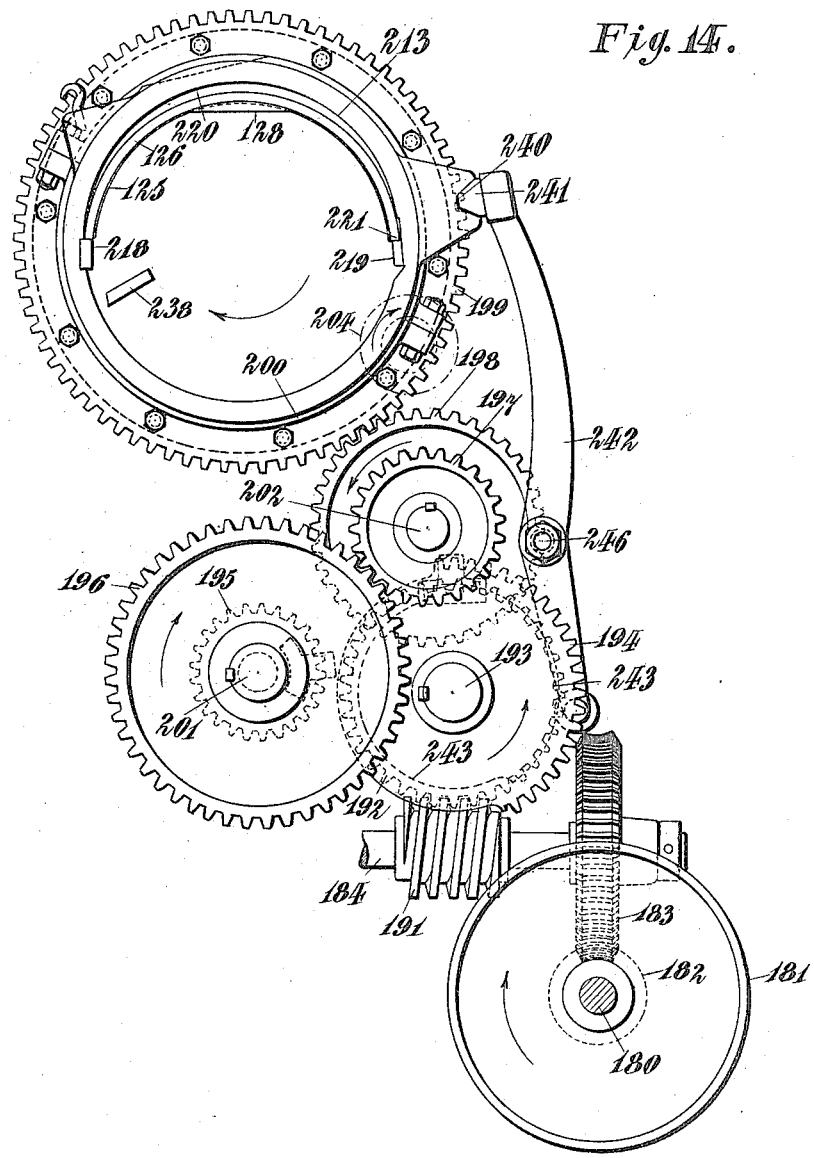

C. E. HOPKINS.
APPARATUS FOR FINISHING CURVED STEREOTYPES.
APPLICATION FILED MAR. 13, 1907.

1,240,850.

Patented Sept. 25, 1917.
15 SHEETS—SHEET 14.

Witnesses:

Inventor
Charles Edward Hopkins
By his Attorneys

C. E. HOPKINS.
APPARATUS FOR FINISHING CURVED STEREOTYPES.
APPLICATION FILED MAR. 13, 1907.

1,240,850.

Patented Sept. 25, 1917.
15 SHEETS—SHEET 15.

Witnesses:

Inventor
Charles Edward Hopkins
By his Attorneys
Redding, Kiddle & Greeley

UNITED STATES PATENT OFFICE.

CHARLES EDWARD HOPKINS, OF WORCESTER, MASSACHUSETTS.

APPARATUS FOR FINISHING CURVED STEREOTYPES.

1,240,850.

Specification of Letters Patent.    Patented Sept. 25, 1917.

Application filed March 12, 1907. Serial No. 362,111.

*To all whom it may concern:*

Be it known that I, CHARLES EDWARD HOPKINS, a citizen of the United States, and resident of Worcester, in the county of Worcester and State of Massachusetts, but at present residing at 38 Camberwell New Road, in the county of Surrey, England, have invented new and useful Improvements in Apparatus for Finishing Curved Stereotypes, of which the following is a specification.

The present invention consists of improvements in apparatus for finishing curved stereotypes such as are cast in that described in the specification of British Letters Patent 12850 of 1903 and 4300 of 1906. The apparatus described therein included hand means for transferring the newly cast and therefore unfinished stereotype from a stereotype-transferring frame $D^2$ to the top surface of a drum or stereotype receiver and automatic means for only cutting off the so-called riser and tail or valve slug—these being the margins respectively above and below the printing form—and leaving the curved ends of the stereotype trimmed and beveled. The specification of an intermediate patent—19333 of 1905—described a finishing apparatus in which the newly cast stereotype was placed upon a receiver, moved by hand along the latter to a hollow cylinder, the cylinder being then connected by hand with a continuously rotating gear having an automatic stop, so that the cylinder and stereotype should be stopped at the end of each rotation. This cylinder had combined with it, automatic means for locking the stereotype to its internal face, so that the stereotype should be carried around with it without slipping, and for unlocking it at the end of a rotation; cutters driven by the gearing to cut off the riser and valve slug, and trim and bevel the curved ends of the stereotype; a knife to shave the concave face of the stereotype; and knives to trim its two straight side edges. After the stereotype had been finished it was removed from the cylinder by hand or pushed out by the following stereotype and placed printing face outward, upon a horse upon which it was locked so that its printing face could be examined and any minor defects in it made good.

The present invention comprises:

(*a*) an improved arrangement of stereotype - carrying frame, stereotype - receiver, and finishing apparatus, in which the stereotype-carrying frame and stereotype-receiver are side by side and the stereotype-receiver substantially axially alined with the finishing apparatus.

(*b*) an improved stereotype-receiver approximately alined by its own weight or by that of the newly-cast stereotype with the hollow finishing cylinder;

(*c*) making the transference of the said stereotype from the stereotype - carrying frame $D^2$ or its equivalent, start the finishing apparatus and means by which such starting is effected;

(*d*) an improved conveyer for taking the said stereotype from the receiver and placing it properly within the said cylinder within the zones of the trimming and beveling cutters, and shaving knife;

(*e*) improved means for automatically stopping the finishing apparatus as soon as a stereotype has been finished; and (*f*) means by which the attendant can stop any moving part of the apparatus, excepting the cutters at any point during one of its cycles, to prevent an accident which may be imminent.

Figure 2:
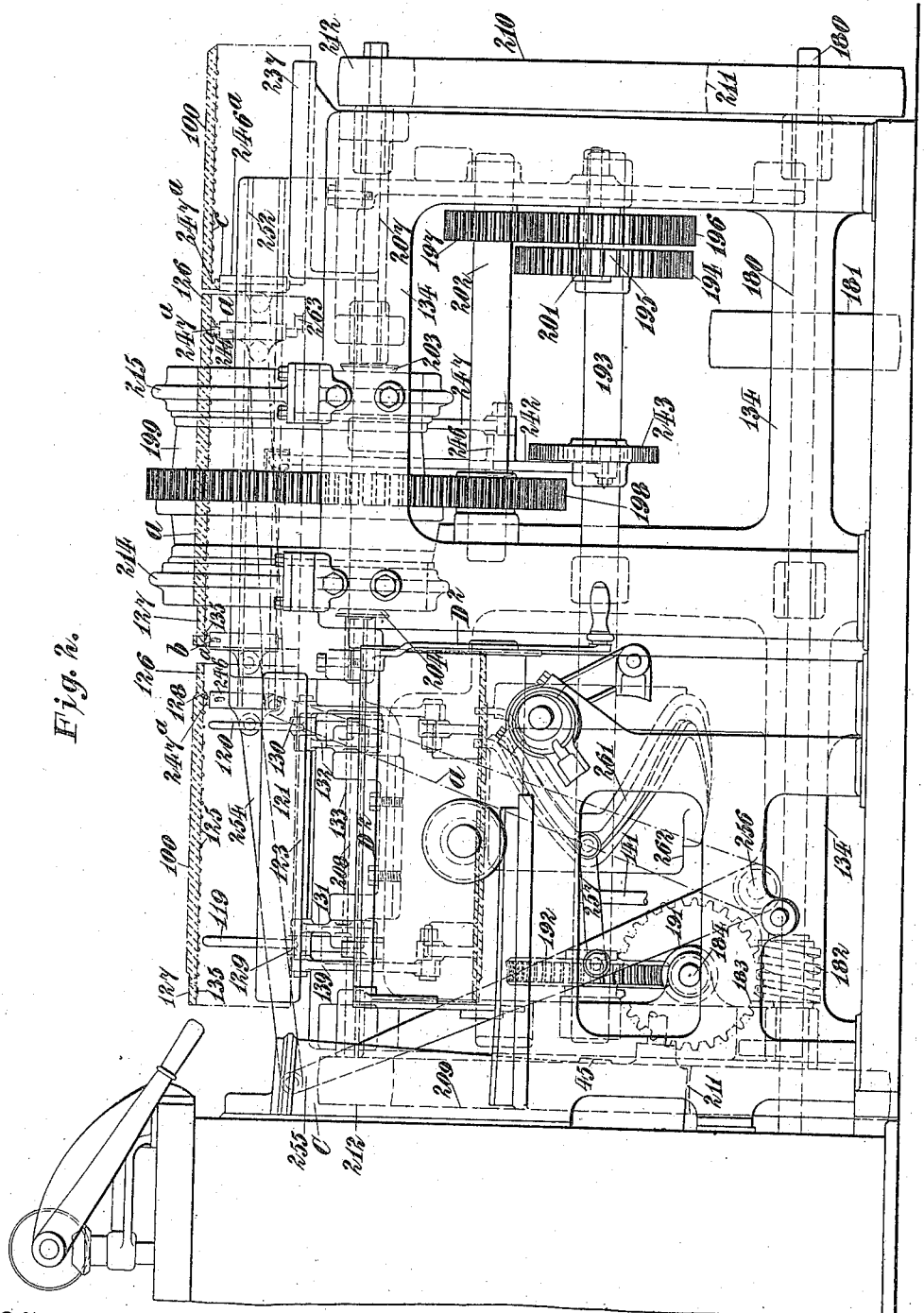
Figure 3:
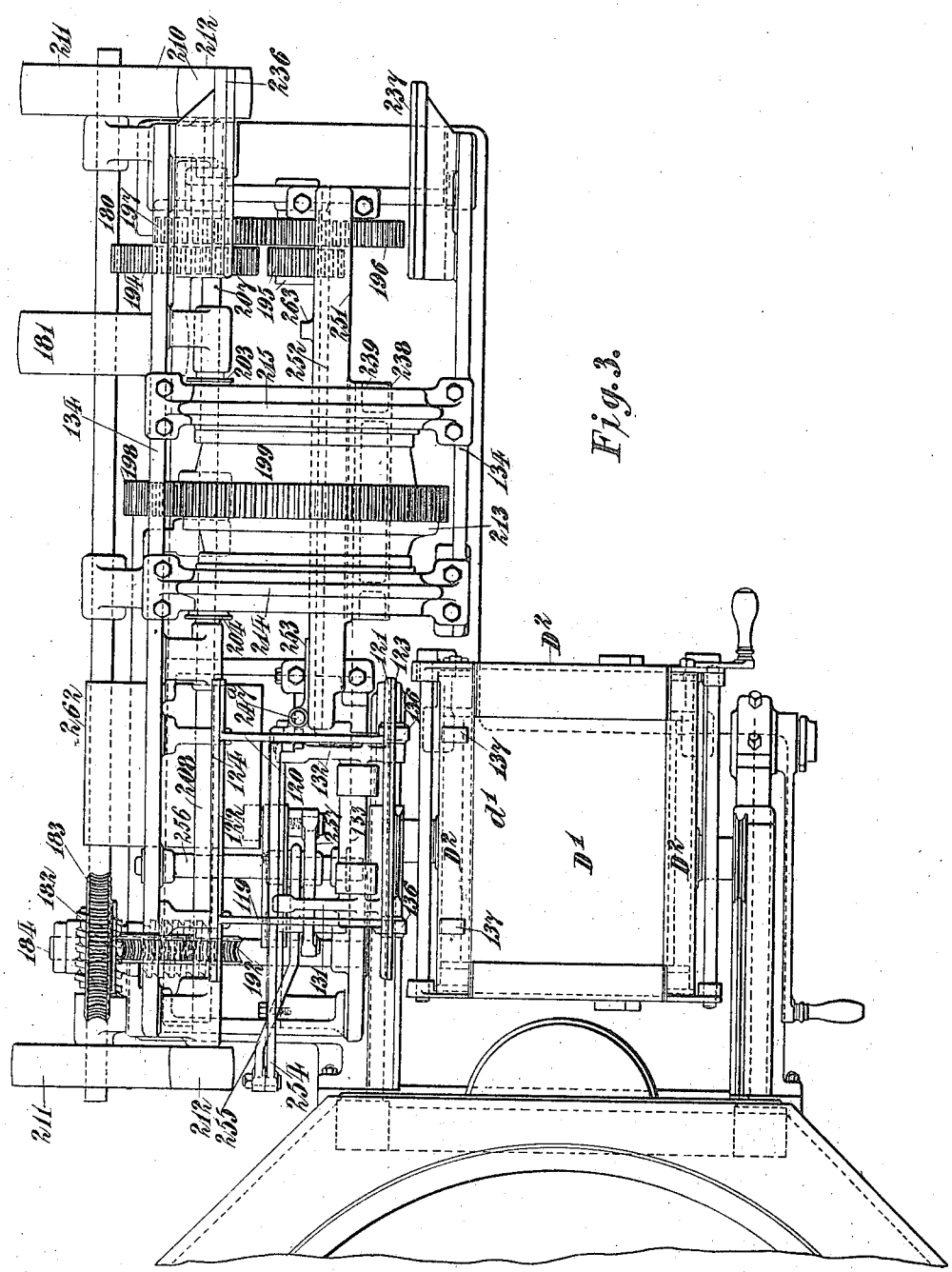
Figure 4:
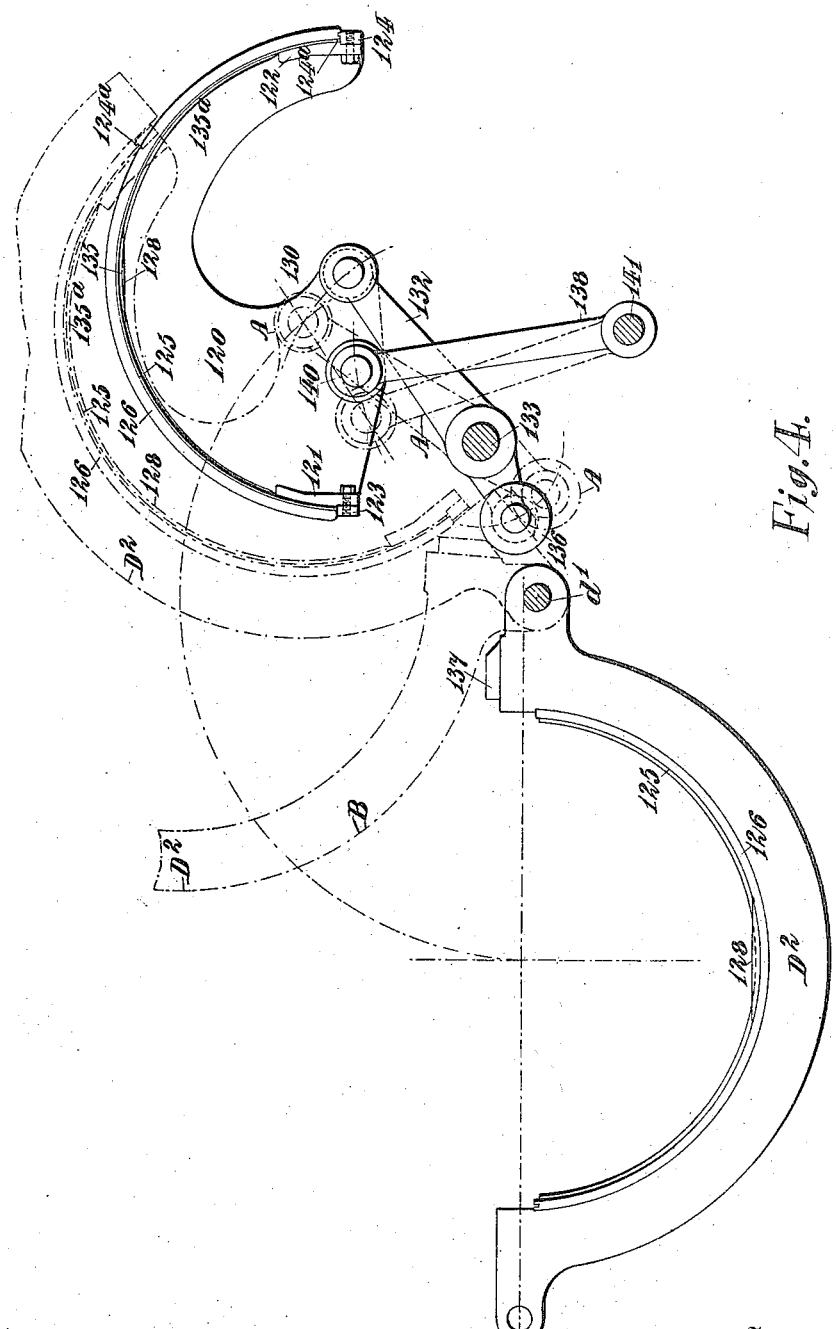
Figure 5:
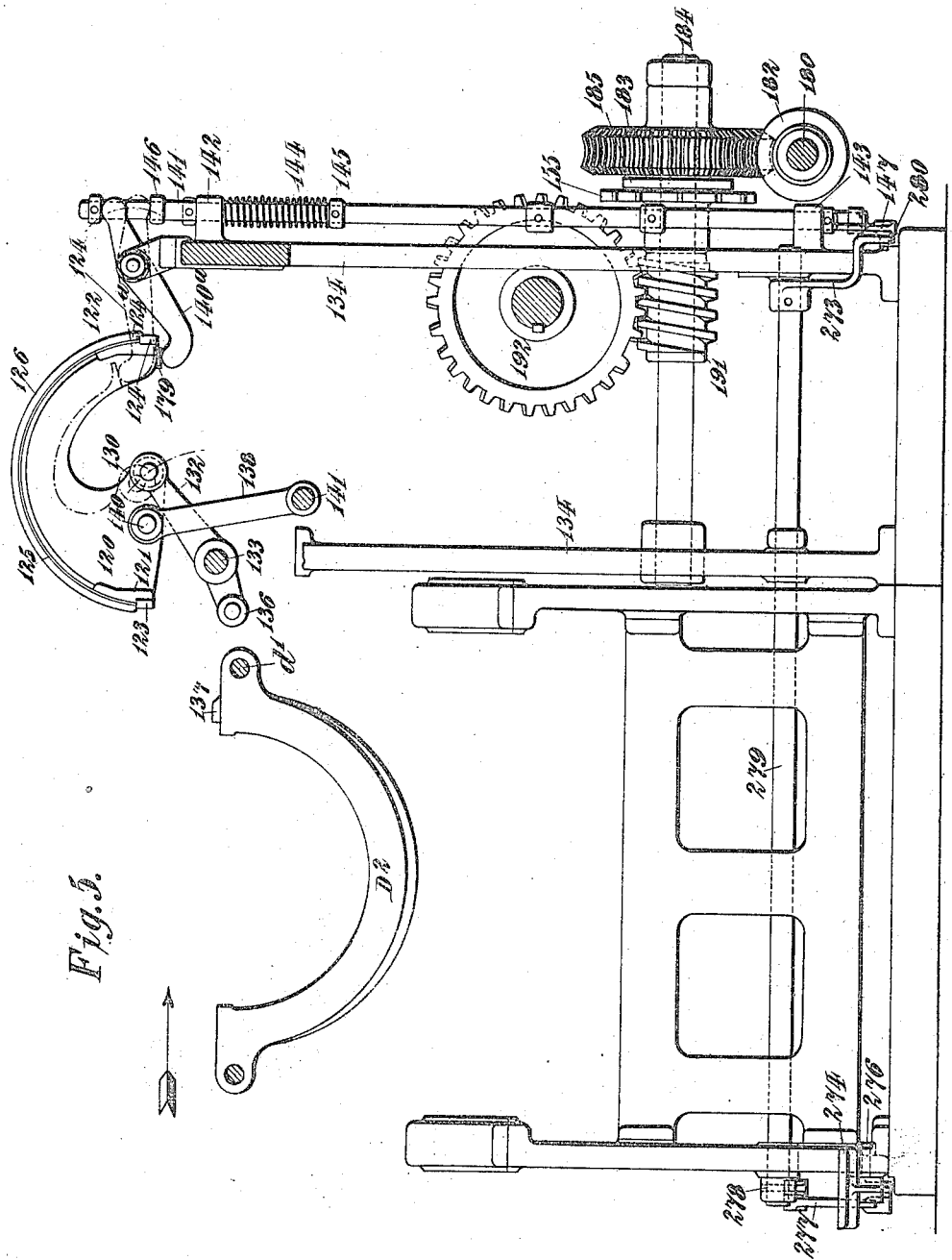
Figure 6:
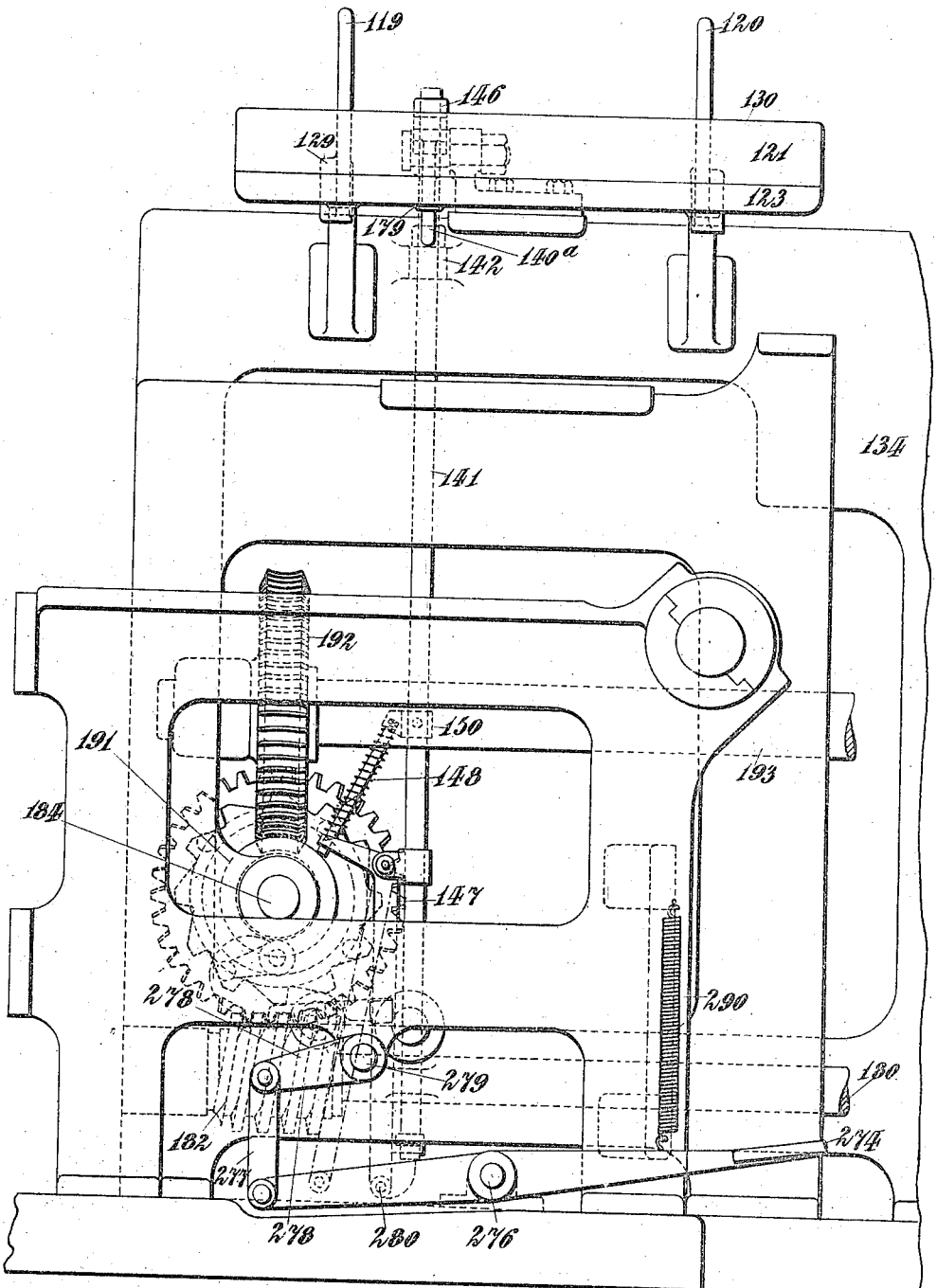
Figure 9:
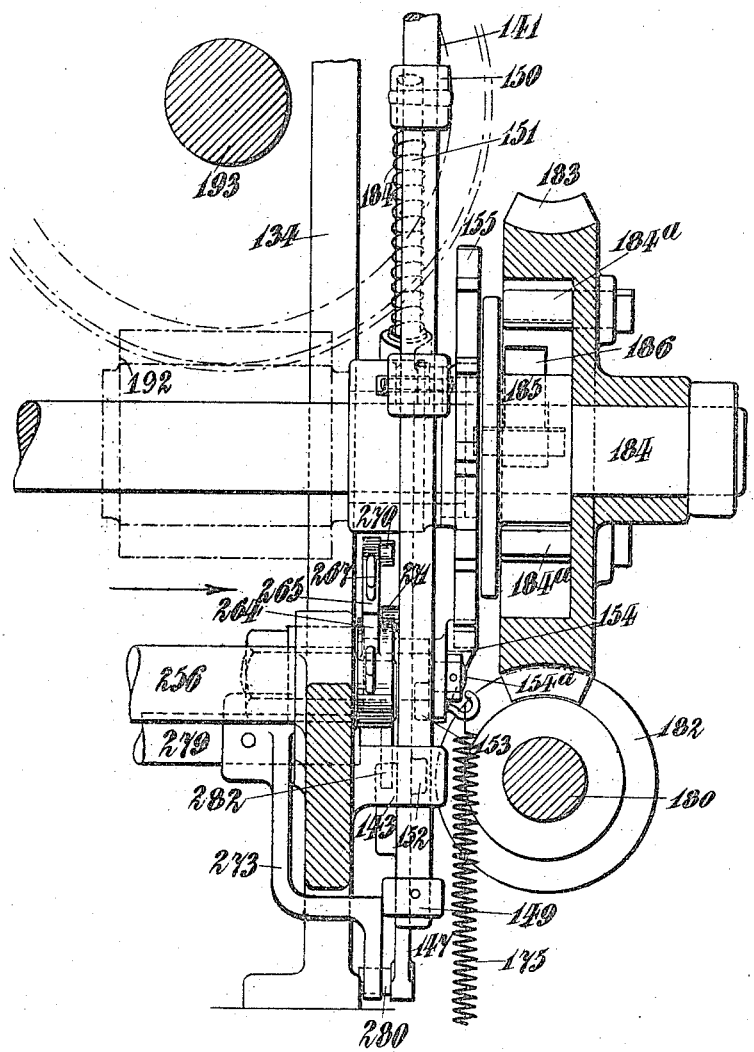
Figure 10:
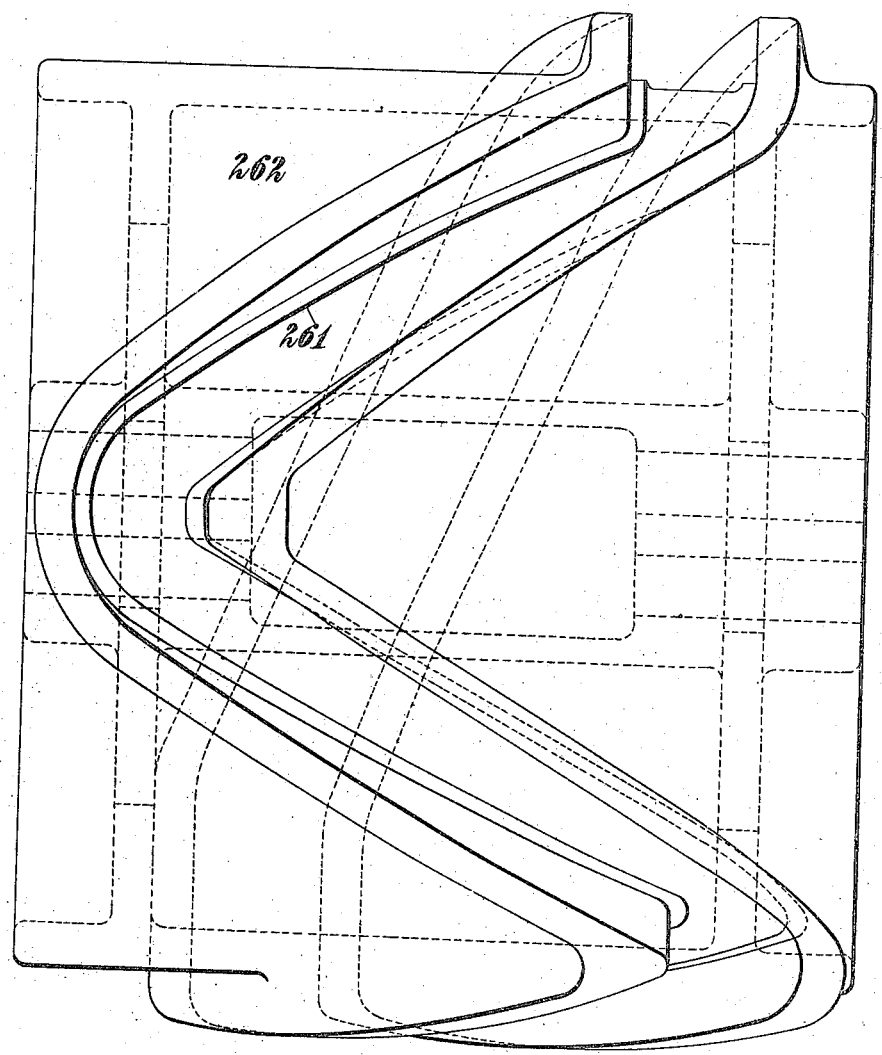
Figure 11:
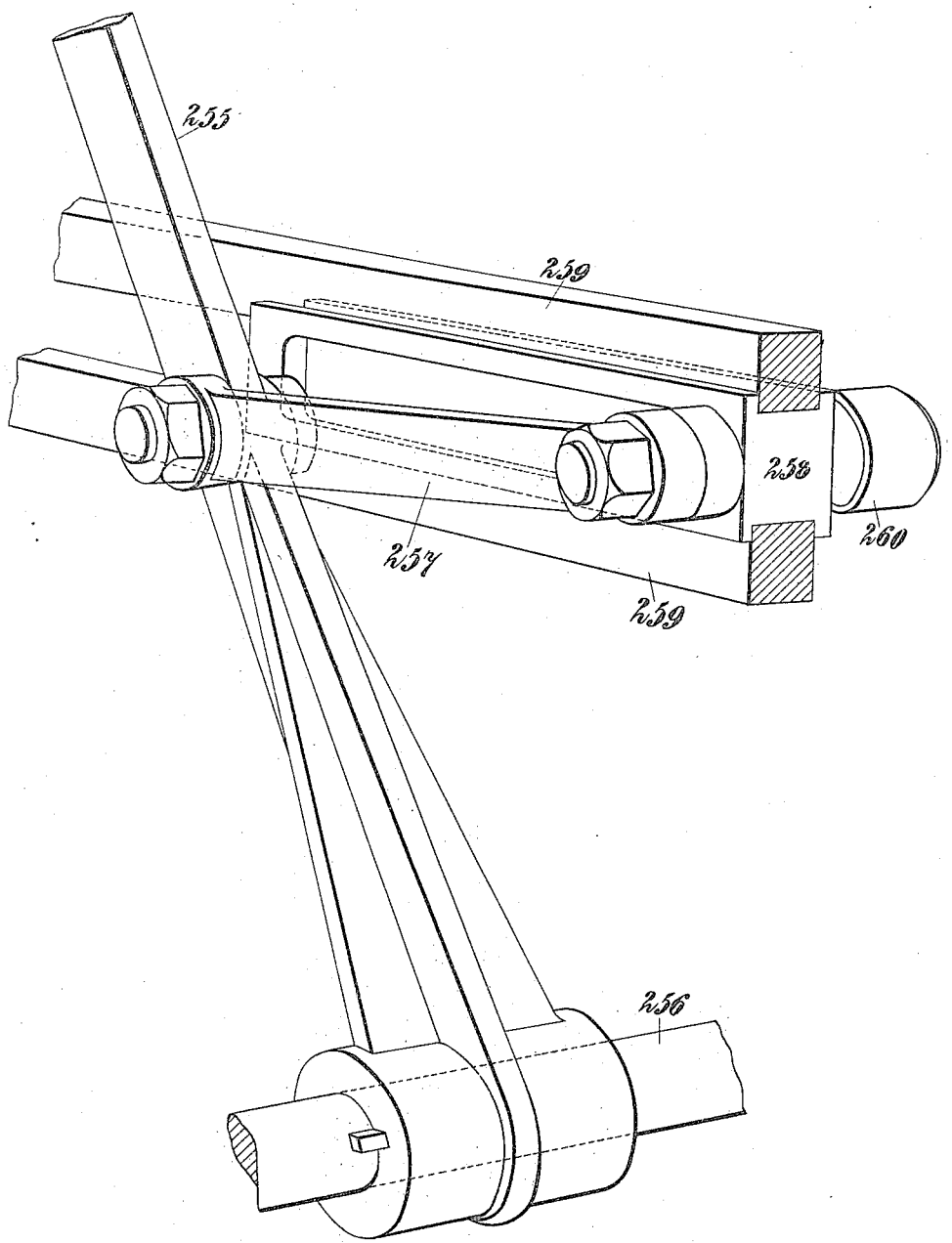
Figure 16:
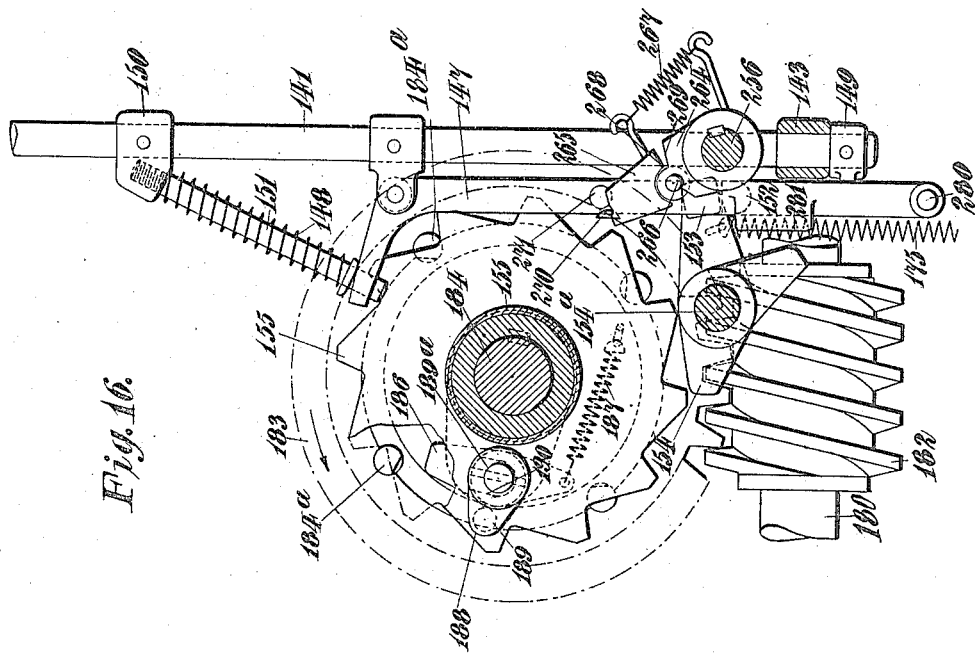
Figure 16:
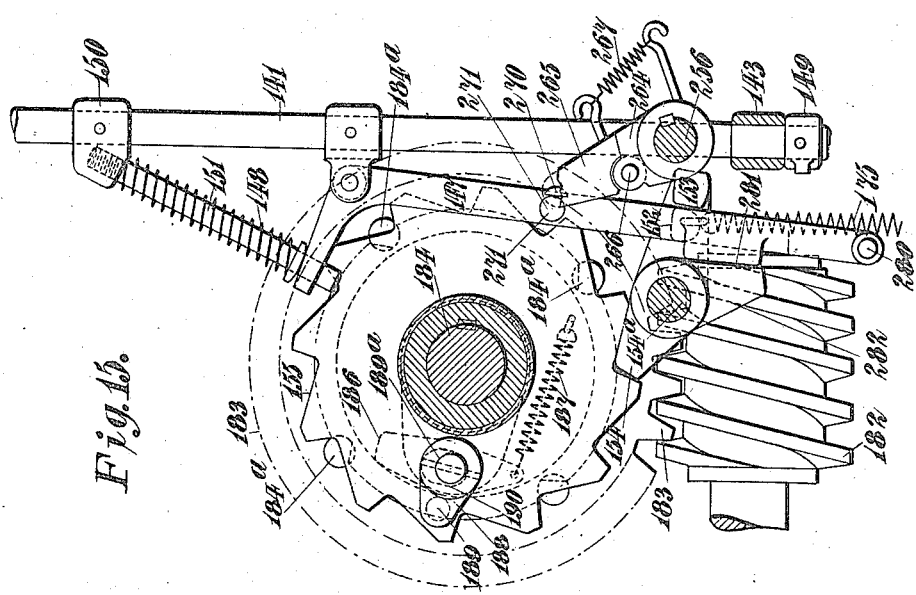
Figure 18:
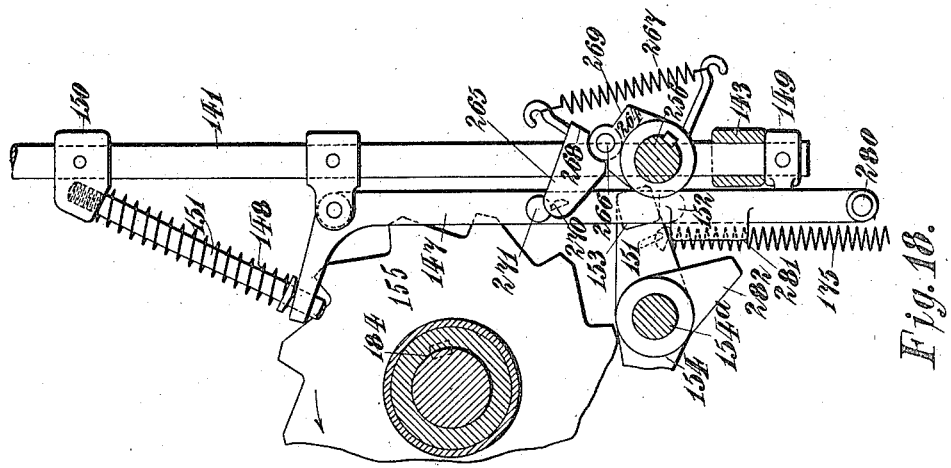
Figure 19:
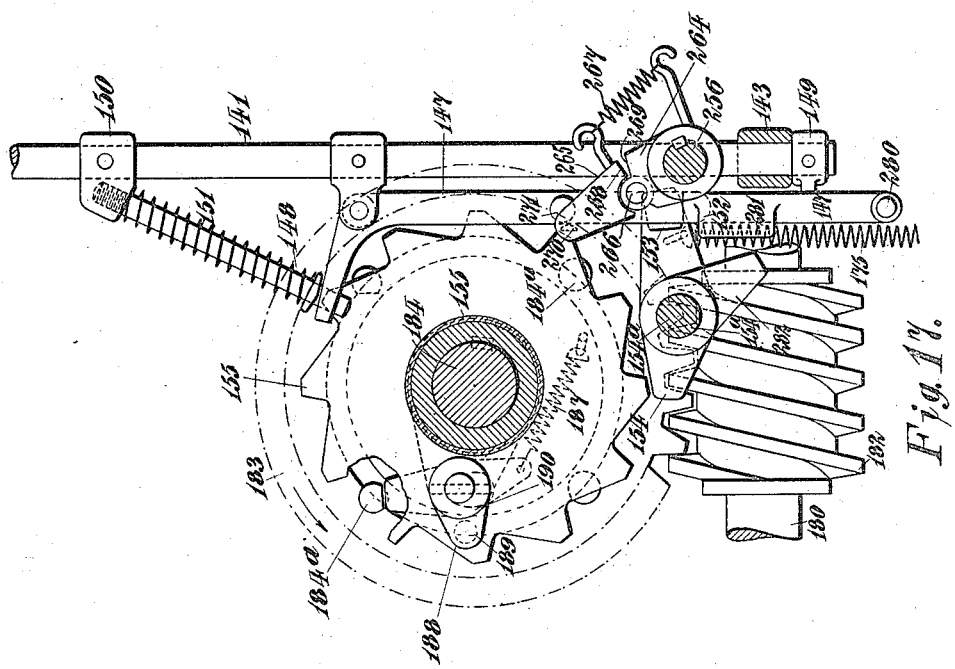

Referring to the accompanying drawings which are to be taken as part of this specification and read therewith:

Figure 1 is a front elevation showing the improved finishing apparatus and the associated casting apparatus in the "at rest" position;

Fig. 2, a side elevation corresponding with Fig. 1 but including additional positions of the stereotype and conveyer;

Fig. 3, a plan corresponding with the "at rest" position of Fig. 1, but omitting the stereotype;

Fig. 4, an enlarged front elevation showing three different positions of the stereotype carrying frame and its coöperation with the stereotype-receiver;

Fig. 5, a sectional front elevation showing the coöperation of the stereotype receiver with the starting lever of the finishing apparatus;

Fig. 6, a left-hand side elevation of Fig. 5 looking at it in the direction of the arrow;

Fig. 7, an enlarged section of part of the driving connections;

Fig. 8, an enlarged side elevation looking at Fig. 9 in the direction of the arrow, of the same connections, the four positions of the radial arm 264, 265 corresponding respectively with Figs. 15, 16, 17 and 18;

Fig. 9, an enlarged front elevation and section corresponding with Figs. 7 and 8;

Fig. 10, an enlarged side elevation of the cam that reciprocates the conveyer;

Fig. 11, an enlarged perspective view of part of the means for reciprocating the conveyer;

Fig. 12, an enlarged sectional front elevation of the finishing cylinder with an unfinished stereotype in it;

Fig. 13, an enlarged side elevation corresponding therewith;

Fig. 14, an enlarged front elevation of the remaining part of the driving connections;

Fig. 15, an enlarged detail side elevation of the starting rod and connected parts, in the "at rest" position;

Fig. 16, a like elevation of the same parts when the stereotype is on the receiver, the detent disengaged from the ratchet wheel and the driving clutch on the point of being closed;

Fig. 17, a like elevation differing from Fig. 16 only in the driving clutch having been closed; and Fig. 18, a like elevation but showing the compound radial arm 264, 265 in the position it occupies when the conveyer has nearly reached the finishing cylinder in its first motion to the front.

*Combination of casting apparatus and finishing apparatus, improved stereotype receiver, and the automatic starting of the finishing apparatus*, (Figs. 1 to 6, 8, 9 and 15 to 18.)—In the apparatus of Patent 12850 of 1903, the transferring frame D² was semi-circular in front elevation and the newly cast stereotype lay upon it, printing face downward, as shown in Fig. 4 hereof. It is pivoted by the pivot d' to the respective side of the bottom D' of the drag, as shown in Figs. 1, 3 and 4, so that swinging it upward and to one side, puts the said stereotype into a reversed position, i. e., with its concave face downward. The object of swinging the said stereotype into this position, was to make it meet the stereotype receiver, on to which the stereotype is to be transferred. This receiver was a drum G which was made to rise to meet the frame D², by the upward motion of the latter, and coöperated with the cutters that cut off the riser and valve slug and beveled the ends of the stereotype. According to the present invention, the receiver is independent of all cutting means and is a semi-circular frame instead of a drum, such frame consisting of two segments 119, 120, connected by two parallel bars 121, 122 each having a horizontal ledge 123, 124, the latter being positioned to receive and support the said stereotype as shown best in Fig. 4, the segments being cut away along the line 135ª—Fig. 4—to enable the transverse ribs 125—Fig. 4—and the sprue 135 that is cast in the valve nozzle 45 of the cope C, to clear them when the conveyer pulls the stereotype off the receiver. The ledge 124 has a central ridge 124ª—Fig. 4—extending for the full length of it to engage in a corresponding groove in the respective side edge of the said stereotype. It is the equivalent of the angle bar 103 of the Patent 4300 of 1906 and serves the same purpose. The segments 119, 120, stand well within the length of the printing face of the stereotype 100, as shown in Fig. 2, in order that the riser 126 and valve slug 127 as well as the lug 128 on the concave face of the riser 126 and which the conveyer seizes hold of when the latter has to pull the newly cast stereotype off the receiver 119 to 124, into the hollow finishing cylinder described farther on, may all three overhang the said segments. This receiver is pivoted by lugs 129, 130, which radiate from its segments 119, 120, at about its center, to the adjacent ends of levers 131, 132 fulcrumed on a fixed axis 133 in the frame 134 of the finishing apparatus, the opposite ends of the said levers carrying rollers 136 and extending far enough toward the pivot line d' of the frame D², for the said rollers to be engaged by projections 137 on the latter, and which projections will, when the frame D² is swung up, rock the said opposite ends downward, and the receiver 119 to 124, upward and toward the then approaching stereotype, as shown by the set of dot and dash lines A in Fig. 4. Further, this receiver is connected by links 138, 139, which are pivoted by their respective ends to pivots 140 located between its center and the side of it next to the frame D², and pivots 141 on the frame 134, below the fulcrum line of the above mentioned levers 131, 132, the effect of such linkage being to rock the rising receiver far enough over to meet the rising stereotype, so that when they do meet, their circular contours shall be parallel with each other. This improved receiver is so mounted and located in the apparatus with reference to the finishing cylinder, that when it has an unfinished stereotype upon it, its axis is a little lower than that of the finishing cylinder and a little to one side—the right—of it. In the Patent 12850/03, the right side of the newly cast stereotype on the drum G was lower than the left side when the said drum began to carry the stereotype past the cutters G². But the linkage just mentioned has the effect of making the improved receiver 119–124 hold the tops of its ledges 123, 124 in the horizontal plane when the newly cast stereotype is ready for the conveyer to push it toward the finishing cylinder. 140ª is a so-called starting-lever fulcrumed upon the frame 134, having its longer arm under the edge 179 of the receiver and its shorter and opposite arm engaged with the top end of a starting rod 141. The spring 144 is preferably a spiral one surrounding the rod 141 and resilient between the guide 142 and a collar 145 beneath it and fast on the rod 141. 146 is a collar fast on the same rod 141 above the guide 142 to prevent the return of the rod 141 rocking the nose of the lever 140ª too high for the side edge 179 to engage with it. The weight of the rod 141 supplemented (it may be) by a weak spring 144, is relied on to return it. 142, 143 are guides fast on the frame 134, for the rod 141 to slide in. The starting rod 141 has a bell crank lever 147 fulcrumed on it, this lever being generally parallel with the rod 141 and kept so by a spring 148 and a stop 149— the latter on the rod 141. The spring 148 is preferably a spiral one resilient between a lug 150 on the rod 141 and the top arm of the lever 147 and supported in its working position by a straight rod 151, fast by one end to the lug 150 and having the other passed through a hole in the said top arm of the lever 147, so that the latter can work freely over it. 152 is a lug on the lever 147 and 153 a projection on the side of a detent 154 pivoted on a fixed stud 154ª. 155 is a ratchet wheel combined with the driving clutch and 175 is a spring pulling from a fixed point in the frame 134 and on the detent 154 to engage it with the wheel 155.

*Driving connections*, (Figs. 1, 2, 3, 7, 8, 9 and 14 to 18.)—The driving shaft 180 extends lengthwise of the frame 134 and is rotated constantly through a driving pulley 181. A worm 182 fast on it, drives a worm wheel 183 which is loose on a transverse shaft 184 in the rear end of the frame 134. The inner face of this worm wheel 183 is hollowed out as shown in Figs. 7 and 9, to embrace several equally distanced driving pegs 184ª fast to it and projecting from it in lines parallel with its axis, as well as a driving clutch 185 fast on the transverse shaft 184. This driving clutch 185 has a radial driving pawl 186 pivoted on it, and a spring 187 fast to the clutch 185 and pulling the pawl 186 into the path of the pegs 184ª. Next to this driving clutch 185 is the ratchet wheel 155 above mentioned, loose on the transverse shaft 184, and having a radial driving arm 188 pivoted on its side and near its periphery, by a pivot 189 that is parallel with the shaft 184. A driving pin 189ª is passed through the nose of the driving arm 188, the ratchet wheel 155, the driving pawl 186 and the driving clutch 185, holding the four together, but the ratchet wheel 155 has an arcuate slot 190 about the pin 189ª to allow of it moving independently of the other three pieces 185, 186 and 188. The shaft 184 has fast on it, a worm 191 engaging in a worm wheel 192 fast on a shaft 193 parallel with the driving shaft 180 to rotate the finishing cylinder 213 (described in the following section) intermittently. This intermittence is secured by a mutilated gear 194 fast on the shaft 193 and a train of gears 195, 196, 197, 198, between it and a gear 199 on the periphery of the said cylinder. The gears 195, 196 are fast together and turn on a horizontal stud 201 fast to the frame 134, the two gears 197, 198 being each fast on a shaft 202 turning in bearings in the said frame. 203, 204 are the cutters for separating the riser 126 and valve slug 127 from the stereotype 100. They are shaped so as to produce a bevel upon the respective end of the said stereotype. Both are of the rotary type and are carried on the ends of their respective shafts 207, 208, which are also arranged lengthwise of the apparatus and are rotated at a proper rate by belt drives 209, 210, from large pulleys 211, 211, on the driving shaft 180 on to small pulleys 212, 212 on the respective shafts 207, 208. The shaft 193 carries a cam 262 to actuate the stereotype conveyer described farther on.

*Finishing cylinder*, (Figs. 1 to 3, 12 to 14.)—This cylinder 213 is hollow, having a clear way through it, and turns in bearing rings 214, 215 supported by the frame 134 of the apparatus. Each ring is made, for the sake of convenience, in two halves joined together by bolts passed through lugs 216, and is fixed to the frame 134 by bolts and flanges 217. The cylinder 213 is located in front of the stereotype receiver 119 to 124 (already described) and approximately axially alined with the lower position of the latter. 218, 219—Figs. 12 and 14—are two supports for the unfinished stereotype. They project radially inward from the internal face of the cylinder 213, the former fixed and the latter movable nearly vertically, but both standing at the same level and in the same plane as the stereotype supports on the receiver, when the cylinder 213 is standing still and receiving the said stereotype. The internal diameter of this cylinder is equal to the external diameter of the unfinished stereotype, but the said level of the supports 218, 219 is lower than the horizontal diameter of the cylinder, so that there is a space 220 between the stereotype 100 and the arch of the cylinder 213 at the moment the conveyer leaves the unfinished stereotype on the supports 218, 219. The movable support 219 has a longitudinal ridge 221 with which a groove in the respective side edge of the unfinished stereotype engages as the latter is pushed into, and the riser 126 through, the cylinder. This groove is no part of the present invention. The stereotype 100 stands—Figs. 12 and 14—with one side edge on the fixed support 218 at a short distance from the adjacent cylinder face and with the opposite edge on the vertically movable support 219. 222 is a clearance space formed lengthwise in the internal face of the cylinder, opposite the support 219, and this latter is set laterally into this space 222, i. e., away from its fellow support 218, so that when the unfinished stereotype is engaged by the groove in its right side edge, on the ridge 221, neither side margins of the printing form can possibly scrape against the cylinder 213. The support 219 is fast on two lugs 223, 224—Figs. 12 and 13—which project to the right from it through one or two suitable openings 225 in the side of the cylinder 213, sufficiently high to allow of the reciprocating and nearly vertical motion of the said support. The latter receives this motion from rods 226, 227, to which the lugs 223, 224 are fast. The rods 226, 227 slide in lugs 228 projecting from the respective side of the cylinder to serve as guides for the said motion. These guides 228 hold the rods 226, 227, with their upper ends inclined toward the cylinder 213, i. e., the said rods are at an angle with the horizontal diameter of the said cylinder and the space 222 is inclined upward at the same angle. The tops of the rods 226, 227 are, respectively, connected to, preferably, the bottom arms of bell crank levers 229, fulcrumed at 230 on the cylinder 213, their opposite arms being, respectively, kept in the paths of cams 231, 232 by springs 233, 234, pulling on them from fixed points on the opposite side of the said cylinder. The cams 231, 232, are fast on the respective cylinder bearing rings 214, 215. At the moment the unfinished stereotype is properly positioned on the supports 218, 219, the bell crank levers 229, are on the highest points of the cams 231, 232 and the movable support 219 is therefore in its lowest position as shown in Fig. 12. As the rotation of the cylinder 213 carries the levers 229 with it, the springs 233, 234, pull the rods 226, 227, toward the cylinder top as the rollers 235 on the said levers roll down the right hand inclines on the cams, thereby making the movable support 219 push the stereotype 100 up to the opposite inside face of the cylinder 213 and obliquely up to the cylinder top, and lastly clamp it, and the riser 126 and valve slug 127 with it, in that position. As the movable support 219 is held by springs, it will always hold the stereotype 100 firmly against the cylinder 213 no matter what may be the arcual length of it, because springs can and will automatically deal with any variation in this length. The cylinder 213 reëngages the bell crank levers 229, with the opposite left hand inclines of the cams 231, 232 as it nears the end of a rotation the travel of the rollers 235 up these inclines lowering the support 219 to its original position, thereby unclamping the stereotype.

The clamped stereotype 100 presents its riser 126 and valve slug 127 outside the respective end of the cylinder 213 as shown in Fig. 2, and the rotary cutters 203, 204, already described, are similarly positioned but between a horizontal and a vertical diameter of the said cylinder, where they are rotated at a proper speed. 236ᵃ—Figs. 12 and 13—is a bracket fast to the ring 215 and projecting to the front. It is wide enough from front to rear to support the riser 126 so that the weight of the latter as it is nearly severed from the stereotype 100, shall not wrench at the latter, and narrow enough to allow it to overbalance and drop when it has been severed. 237ᵃ is a similar bracket fast to the ring 214 to similarly support the valve slug 127 and allow it to drop. The usual shaving knife 238 for shaving the inside face of the stereotype 100, stands on the opposite side of the cylinder to the cutters 203, 204 and below the horizontal diameter. It is fixed to a bracket 239 that is radially adjustable on the guide 251 in which the conveyer reciprocates. The riser 126 and valve slug 127 are both almost completely severed by the respective cutters 203, 204 before the stereotype 100 comes up to the knife 238. 236, 237 are suitable brackets fast to the main frame and projecting from it in front of the cylinder 213 to receive the finished stereotype 100 as the conveyer pushes it out of the said cylinder. The latter is stationary while an unfinished stereotype is being pushed into it and rotated only during the time the said stereotype is being clamped, finished, and unclamped, these three stages being begun and carried through during a single rotation of the cylinder. The mutilated gear 194 already mentioned, is therefore set on its shaft 193 to get into gear with the next driven member 195 of the driving gear, at the moment when the conveyer has delivered on unfinished stereotype on to the cylinder supports 218, 219, and to disengage from that gear, at the moment when the cylinder 213 has completed the respective rotation. To prevent any erratic motion on the part of the cylinder 213, there is provided an automatic cylinder lock consisting of a V-notch 240—Fig. 14—in a projection fast on the outside of the clyinder; a V-nosed detent 241 on the top end of a detent lever 242 fulcrumed at 246 on a bracket 247—Fig. 12—fast on the frame 134 and adapted to engage the notch 240 when the cylinder 213 is in its stationary position; a cam 243 fast, preferably, on the shaft 193 and in constant engagement with the detent lever 242 to make it rock the detent 241 into the notch 240 as soon as the cylinder 213 has completed a rotation and to allow it to be out of engagement at other times; and a spring actuated device to keep the detent 241 disengaged. This device is shown in Fig. 12, as consisting of a spring 243ª pulling from the bracket 247 on a bell-crank lever 244 fulcrumed at 245 on the frame 134 and carrying a pin 245ª in constant engagement with the lever 242.

*The stereotype conveyer,* (Figs. 1 to 3 and 10 to 12.)—This organ of the apparatus is situated behind the finishing cylinder 213 and in front of the stereotype receiver 119 to 124. When the latter has an unfinished stereotype on it, its ledges 123, 124, register with the supports 218, 219, on the cylinder 213, before the support 219 is raised. The function of the conveyer is to then take hold of the unfinished stereotype by engaging with the lug 128 already described, to move it forward up to the conveyer stop (described farther on) i. e. far enough to push the said stereotype fairly on to the supports 218, 219, in the cylinder 213, to stop in this forward position for a short time, to move rearward to nearly its original position while the rotation of the cylinder 213 is finishing the stereotype 100, to stop in this rear position for a short time, to then engage with the rear end of the finished stereotype and push it forward out of the cylinder 213 on to the brackets 236, 237 to then return to its original position, and to wait there until the descent of the stereotype receiver 119–124, with another unfinished stereotype on it, starts the apparatus again. The conveyer consists of a vertical cylindrical head 246ª and a finger 247ª working piston-wise within the head 246ª, from and above the top of which, it is projected and held by a spring 248 seated within the head 246ª, the finger being also capable of passing downward through the bottom of the head—Fig. 12. When the conveyer is in its rear position, the lug 128 comes down just in front of the finger 247ª. The unfinished stereotype on the frame D² and the receiver 119–124, meet each other with sufficient force to make the ridge 124ª on the receiver, wedge itself in the corresponding groove in the unfinished stereotype and as it is the top of the riser 126 that carries the lug 128 (the part on which the conveyer pushes), the rear half of the stereotype would be likely (especially if the ridge 124ª is not wedged into the rear portion of the said groove as tightly as it is in the front portion of the same) to tip up off the ledges 123, 124 and drop back on to them again when the conveyer had succeeded in pushing the stereotype for a short distance. Sometimes it might not drop back on to the ledges, before it was up to the cylinder 213, in which case the front of the riser 126 could not slide properly on to the supports 218, 219 in the said cylinder.

To prevent this wedging of the front half of the ridge 124ª in the corresponding groove in the said stereotype, the finger 247ª has a slot 249 through it and a pin 250 carried by the head 246ª engaging in it, the said slot and pin being so positioned that the stereotype shall come down upon the finger 247ª and press it down into the head 246ª as far as the slot and pin device will allow, before the receiver 119–124 has reached its lowest position, which will have the effect of slightly separating the front portion of the said groove from the respective portion of the ridge 124ª. Further, the said slot and pin device must allow the finger 247ª to rise high enough to engage the rear end of the finished stereotype 100, to push the latter out of the cylinder 213. The head 246ª reciprocates in a fixed horizontal guide 251. This guide extends lengthwise of the apparatus, through the cylinder 213, is proportioned to the length of the travel of the conveyer and is fixed upon the frame 134. It has a guide way 252 in which engages a guiding lug 253 fast on the side of the head 246ª and which extends for a short distance forward of the said head to steady its motion along the said guide way. The means for reciprocating the conveyer head 246ª consist of a link 254 pivoted by one end to the said head and by the other end to the top end of a lever 255 fulcrumed in a rock shaft 256 mounted in the frame 134, a connecting rod 257 from the lever 255 to a head 258 to both of which it is pivotally connected, fixed horizontal guides 259, 259, between which the head 258 reciprocates and a roller 260 engaging in a groove 261 in a cam 262 fast on the shaft 193. This groove 261 is set out so as to impart the above described alternate motions and rests to the conveyer, all properly timed. It may sometimes happen that an unfinished stereotype will not move freely along the ledges 123, 124, thereby resisting the forward motion of the lever 255, to the extent even of bending it temporarily backward a little. (It is intentionally long enough to permit of its being so bent and of afterward straightening itself without any part of the means for reciprocating the conveyer being injured). To compensate for this bending back of the lever 255, the cam groove 261 is set so as to move the conveyer farther to the front than is theoretically necessary to push the unfinished stereotype into the cylinder 213, and the guide 251 carries a fixed stop 263 which is so positioned thereon, that the bottom end of the finger 247ª, projected by the weight of the said stereotype, below the conveyer head 246ª for this purpose, engages the said stop 263 at the moment when the said stereotype has been pushed far enough into the cylinder and not before, whereby the finger 247ª is prevented from pushing the stereotype too far. And if the said stereotype has moved freely and not resisted the lever 255, the capacity of the finger 247ᵃ to travel too far to the front will at the worst only temporarily bend the lever 255 backward a little, but the latter will straighten itself again as soon as it begins its return motion.

*Means for automatically stopping the finishing apparatus as soon as a stereotype has been finished and the conveyer returned to its normal position*, (Figs. 5, 6 and 15 to 18.)—The reciprocating motion of the rock shaft 256 already described in connection with the conveyer, corresponds, of course, with the reciprocating motion of the conveyer. This shaft 256 has a short radial arm 264 fast on it and to the outer end of which, a second radial arm 265 is pivoted by the pivot 266. A spring 267 pulling on the arm 265 from a fixed point fast to the rock shaft 256, tends to keep a shoulder 268 on the arm 265 up to a stop 269 on the arm 264, so as to keep the former radially alined with the latter. The arm 265 carries a semi-circular stud 270, and the bell-crank lever 147 carries a stud 271 which is so positioned thereon that it is in engagement with the flat side of the stud 270 when the apparatus is at rest. The action of the parts just described is specified in the section—Operation of the improved finishing apparatus.

*Accident stop*, (Figs. 5, 6, 8 and 9.)—It may sometimes become desirable to stop the finishing apparatus at some point or other during one of its cycles, to prevent an accident that the attendant perceives to be imminent. To enable him to do this, there is provided a convenient foot lever 274 connected with a rocking arm 273 standing in touch with the bell crank lever 147 when the latter is holding the driving clutch closed, so that the depression of the treadle 274 of the foot lever 272 shall disengage the lever 147 from the ratchet wheel detent 154, by making the arm 273 engage a stud 280 on the lever 147, rock the latter to the rear, thereby carrying the lug 152 from under the projection 153 (when these two last mentioned parts are in the respective positions shown in Figs. 17 and 18), thereby leaving the latter free to be pulled by its spring 175 into engagement with the ratchet wheel 155, whereby the driving clutch is opened and the apparatus stopped. As the stud 280 is on the bell crank lever 147, it moves up and down with it, the coöperating face of the arm 273 being long enough—Fig. 8, to keep in contact with the stud 280 during that up and down motion. The foot lever 272 is fulcrumed upon a fixed stud 276 and has its rear end connected by a link 277 to the outward end of a rearwardly projecting arm 278 fast upon a transverse shaft 279 rocking in bearings in the frame 134. The arm 273 is fast upon the shaft 279. 290 is a returning spring.

*Operation of the improved finishing apparatus.*—The apparatus takes one stereotype from the receiver, finishes and delivers it during a single cycle of its operation. During such cycle, the finishing cylinder makes one complete rotation. Such rotation occupies half a cycle, the cylinder remaining stationary during the other half. When the apparatus is at rest, the frame $D^2$ is down upon the horizontal bottom $D'$; the receiver 119–124 has its side 179 on the starting lever 140, thereby making it hold the starting rod 141 up—Fig. 5, full lines—; the conveyer is in its rear position—Fig. 2, full lines—thereby holding the lever 147 away from the starting rod 141 and the lug 152 clear of the detent 154, the spring 275, consequently, holding the detent 154 engaged with the ratchet wheel 155 and the driving clutch open—Fig. 15; the detent 241 is holding the cylinder 213 locked—Fig. 14; the cams 231, 232 are holding the support 219 in its lowest position—Fig. 12; and the mutilated gear 194 and cam 243 are in the positions shown in Fig. 14.

An unfinished stereotype is supposed to be lying on the frame $D^2$ ready for removal to the receiver 119–124—Figs. 1, 3 and 4. This removal is effected by rocking the frame $D^2$ on its pivot $d'$, whereby the concave face of the stereotype and the top of the receiver 119 to 124, meet, as shown by the dot and dash lines A of Fig. 4, the frame $D^2$ being thereupon swung down upon the bottom $D'$ again (as indicated by dot and dash line B of the same figure), so leaving the stereotype upon the receiver, as in the patent 12850 of 1903. As the improved receiver 119–124 is rocked up by the engagement of the frame $D^2$ with it, the starting rod 141 drops, raises the left hand end of the starting lever 140—Fig. 5, dot and dash lines—carries the stud 271 on the lever 147 down clear of the stud 270 on the radial arm 265, and the lug 152 (likewise on the said lever 147) below the level of the projection 153 on the detent 154. As soon as the stud 271 clears the stud 270, the spring 148 rocks the depending arm of the bell-crank lever 147 up to the stop 149, thereby placing the lug 152 vertically under and a little below the projection 153—Fig. 8. The receiver 119 to 124 with the unfinished stereotype on it, drops below its former position (the one shown by the dot and dash lines in Fig. 5) into the one shown by the full lines in Figs. 4 and 5. As it drops, its side 179 again engages the adjacent arm of the starting lever 140 and raises the starting rod 141, thereby making the lug 152 engage the projection 153 on the detent 154 and disengage the latter from the wheel 155—Fig. 16—whereupon the spring 187 pulls the ratchet wheel 155 through a short arc, thanks to the slot 190, and in the working direction, thereby rocking the driving pawl 186 about the driving pin 189 into the path of the driving pegs 184ª, whereby the next following peg 184 comes up to the driving pawl 186, closes the driving clutch and starts the shaft 184—Fig. 18. During the last mentioned rise of the rod 141, the stud 271 found the stud 270 in its path and rocked it to the rear, thanks to the pivot 266—Fig. 18.

The cam 262 begins to turn with the shaft 184. At that moment, the conveyer finger 247ª stands in its rearmost position—Fig. 2, full lines—the weight of the unfinished stereotype holding the finger 247ª down in the conveyer head 246, and the bottom of the slot 249 holding the front portion of the stereotype up, but at an angle too small to show in the figure. The cam groove 261 makes the conveyer move to the front far enough to deposit the unfinished stereotype upon the cylinder supports 218, 219, with its riser 126 and valve slug 127 projecting beyond the respective ends of the cylinder 213 in the proper position for their being cut off by the respective cutters 203, 204, along the proper circles—Fig. 2, dot and dash and section lines $a$. The stereotype having been thus deposited, the cam groove 261 stops the conveyer. Just before it stops, the spring 243ª unlocks the cylinder 213 and, as the gear 194 is up to the gear 195, the cylinder 213 begins to make a single rotation. During this rotation, the springs 233, 234, raise the support 219, thereby moving the unfinished stereotype upward and to the left and clamping it to the adjacent face of the cylinder 213; the riser 126 and valve slug 127 are cut off by the respective cutters 203, 204, and the concave face of it shaved by the knife 238; and the cams 231, 232 lower the support 219 and the finished stereotype 100. The cylinder 213 is then locked by the cam 241 and the finished stereotype 100 is ready for being pushed out of the cylinder on to the brackets 236, 237.

As the arm 264, 265 is fast on the shaft 256, it moves with the conveyer, so that as the latter is pushing the unfinished stereotype into the cylinder, the arm 264 is rocked to the front and the arm 265 (with its stud 270 still in engagement with the stud 271) rocked still farther back—Fig. 18—until the stud 270 has cleared the stud 271, whereupon the spring 267 alines the arm 265 with the arm 264, in order that the stud 271 shall at this moment be to the front of the bell crank lever 147—Fig. 8, dot and dash line $a$.

As soon as the unfinished stereotype had been pushed off the receiver 119-124, the starting rod 141 would have been free to drop, and this drop would have left the detent 154 free to be engaged with the wheel 155, which would mean stopping the apparatus before the cylinder 213 had completed its rotation. But this stoppage is prevented by the weight of the empty receiver 119-124 upon the left arm of the starting lever 140 keeping the starting rod 140 up.

The act of clamping the untrimmed stereotype to the cylinder takes its weight off the conveyer finger 247ª and the latter is forthwith raised by its spring 248, the radial projection of the said finger from the center of the cylinder 213 being less than the radial distance between the concave face of the clamped stereotype and the said center. During the rotation of the cylinder 213, and while the stereotype as it is being finished, is more or less below a horizontal diameter of the cylinder, the cam groove 261 moves the conveyer to the rear, stopping when the finger 247 has passed beyond the rear end of the finished stereotype 100, Figs. 2 and 8, dot and dash lines $b$. During the time the conveyer is so stopped, the support 219 is lowered, and this lowering brings the top of the stereotype 100 low enough for the finger 247ª to engage its rear end. The cylinder 213 being now locked, the cam groove 261 moves the conveyer to the front again thereby causing the finger 247ª to eject the stereotype 100—Fig. 2, dot and dash and section lines $c$ and dot and dash lines $c$ of Fig. 8. As soon as the ejection is effected, the said groove returns the conveyer to the rear of the apparatus, the arm 264, 265 making the stud 270 engage the stud 271, thereby rocking the depending arm of the bell-crank lever 147 to the rear and moving the lug 152 from under the projection 153 on the detent 154, whereupon the latter is pulled by its spring 175 into engagement with the ratchet wheel 155—Fig. 15—thereby opening the driving clutch and bringing the apparatus to the "at rest" position with which this section of the specification began.

*Modifications.*—Instead of the spring 175 (or in addition to it, so as to act in the event of the spring failing to act) there may be a lug 281—Figs. 15 to 18—projecting to the rear from the lever 147 and adapted to engage with the downwardly depending lug 282 on the front portion of the detent 154 for the purpose of engaging the latter with the wheel 155. This applies to both the automatic stopping of the finishing apparatus and to the accident stop.

I claim:

1. The combination of an independent stereotype receiver; a finishing cylinder; clutch controlled mechanism for operating the latter; and means actuated by the receiver to start the said mechanism.

2. The combination of an independent stereotype receiver; a finishing cylinder;

mechanism for operating the latter; and means actuated by the receiver to start said mechanism.

3. The combination of a stereotype receiver, a finishing cylinder, means to hold them with their axes nearly coincident, and means controlled by one of them to start the finishing cylinder when the said one is moved into axial alinement with the other.

4. The combination in an apparatus for finishing stereotypes, of a stereotype receiver; a conveyer head having a finger projecting therefrom to receive the weight of the front portion of an unfinished stereotype; and means for preventing the weight of the latter depressing the finger low enough to allow the said portion to engage with the respective part of the stereotype receiver.

5. The combination of a conveyer head; a spring protruded finger; a device for limiting the motion of the finger in the said head; a finishing cylinder having one fixed and one movable support to hold the top of the unfinished stereotype at a distance from the cylinder; means for reciprocating and stopping the conveyer and means for raising and lowering the movable support.

6. The combination of a conveyer head, a finger movable therein, means for limiting movement of the finger, a cam, a connecting element between the cam and head to cause movement of the head and finger as the cam operates and a positioning stop for limiting the travel of the conveyer.

7. In an apparatus for finishing curved stereotypes, the combination of a conveyer consisting of conveyer head and finger capable of the specified reciprocating motion therein; a finishing cylinder having one fixed and one movable stereotype support; means for clamping the unfinished stereotype to the cylinder; and means for locking and unlocking the cylinder.

8. The combination with a stereotype transferring frame capable of holding a cast stereotype thereupon, a stereotype finishing cylinder and an intermediate stereotype receiver alined therewith; the latter being adapted to receive and support the stereotype preparatory to its being transferred to the finishing cylinder; said transferring frame capable of moving the plate to position upon the intermediate receiver.

9. The combination of a stereotype transferring frame, a finishing cylinder and an intermediate stereotype receiver; the transferring frame and receiver being located side by side and means for moving the stereotype in the transferring frame and placing it on the receiver; the receiver and finishing cylinder being in substantial alinement.

10. In a device of the class described the combination of a member to support a newly cast plate, a finishing means, an intermediate receiver, means to convey the plate from the position in which it is when first being received upon the device to position on the intermediate receiver, and means to convey the plate from the receiver to the finishing means.

11. The combination of a stereotype finishing cylinder; a stereotype receiver adapted to be approximately axially alined therewith; a conveyer adapted to reciprocate between the said cylinder and receiver; driving mechanism adapted to impart the respective motions to the conveyer and cylinder; and means engaged by the receiver when it has the stereotype upon it, to start the said driving mechanism.

12. The combination of a finishing apparatus; a conveyer; means for reciprocating it; an arm carried thereby; a driving clutch, and means actuated by the said arm as the conveyer reaches the "at rest" position, to open the said clutch.

13. The combination of a finishing cylinder; a plate receiving support and a conveyer movable within the cylinder having a plate engaging element which is adapted to move the plate from the cylinder to the receiving support.

14. The combination of a finishing cylinder; plate receiving supports located on opposite ends of the cylinder and conveying means for transferring the plate from the support to the cylinder and from the cylinder to the second support; said conveying means operable in conjunction with movements of the cylinder.

15. The combination of a stereotype finishing apparatus for receiving a curved stereotype plate having a projection on the inner side, a conveying or pushing member adapted to engage the projection and position the plate within the finishing apparatus, and means in the finishing apparatus for removing the projecting portion from the plate.

16. In combination, a rotatable support adapted to receive a stereotype plate therein, mechanism adapted to rotate said support, plate finishing mechanism adapted by the rotation of said support to finish said plate, positively driven means for forwarding said plate into said support, means for automatically stopping the operation of said plate forwarding means during the rotation of said support, and means for automatically stopping the rotation of said support after said plate is finished.

17. The combination of a finishing cylinder adapted to receive a curved stereotype plate having straight edges and supports within the same to engage the straight edges of the stereotype, one of said supports being movable, said movable support having a longitudinal projecting rib for engaging in a recess in the edge of the plate and holding its type face away from the cylinder.

18. The combination with a finishing cylinder and a support movable therein to clamp an unfinished stereotype thereto, of a longitudinal ridge on the said support spaced from the inner surface of the cylinder adapted to engage with the respective side of the said stereotype, to push it upward and toward the opposite internal face of the said cylinder without allowing its type face to scrape on the cylinder and to remain therein during the time the unfinished stereotype is being clamped, finished and ejected.

CHARLES EDWARD HOPKINS.

Witnesses:
THOMAS SYMONDS,
HERNANDO DE SOTO.

Copies of this patent may be obtained for five cents each, by addressing the "Commissioner of Patents, Washington, D. C."